Nov. 12, 1929.    A. J. BAKER    1,735,229
TIMING GEAR
Filed March 15, 1924
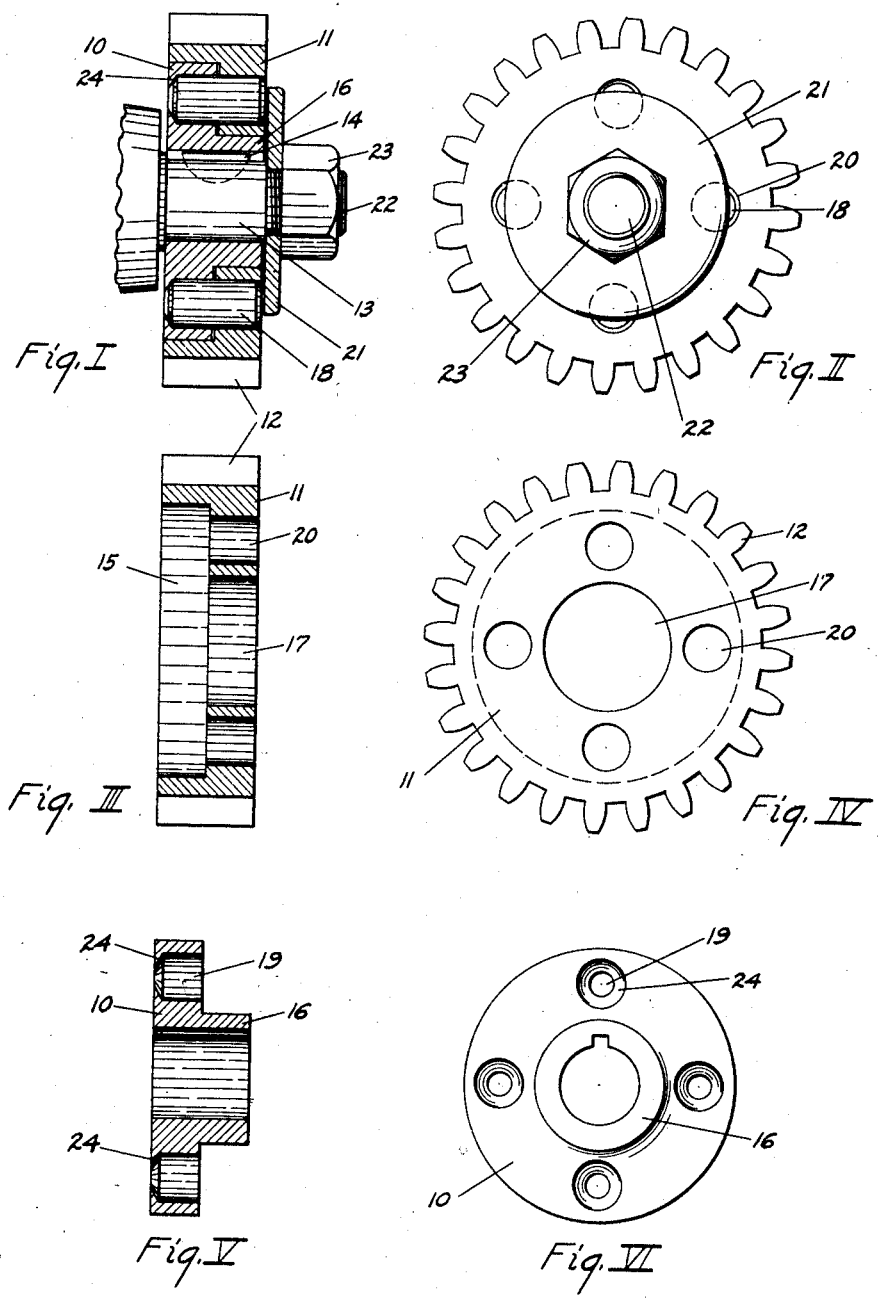
INVENTOR.
Arthur J. Baker
BY Solon J. Boughton
ATTORNEY.

Patented Nov. 12, 1929

1,735,229

UNITED STATES PATENT OFFICE

ARTHUR J. BAKER, OF TOLEDO, OHIO, ASSIGNOR TO THE WILLYS-OVERLAND COMPANY, OF TOLEDO, OHIO, A CORPORATION OF OHIO

TIMING GEAR

Application filed March 15, 1924. Serial No. 699,568.

This invention relates to improvements in timing gears for automotive gas engines, having particular reference to a gear constructed to overcome what is known in the art as "thrashing"; that is, regularly recurring motions produced in one or more of the gears, other than that produced by the intended rotation of the particular gear upon its own axis. The "thrash" may be due, in part at least, to a certain jerkiness in the crankshaft gear, which is transmitted to the cam-shaft gear, and added to some inherent thrash in the latter gear. Possibly the thrash of the cam-shaft and generator gears in mesh with each other and combined in timed relation, produces a different and possibly greater noise than would be produced otherwise. At any rate, the noise is objectionable, and it is the object of the present invention to reduce it as far as possible.

A specific object of the invention is to construct one or more of the gears for use in a gear train in such a manner as to render the operation of the train relatively noiseless.

Another object of the invention is to provide a noiseless gear of simple construction, the parts of which may be quickly and accurately assembled and applied to a power shaft, the nature of the construction being such as to reduce the cost of manufacture to a minimum in a gear of this type.

Other objects relating to details of construction and economies of manufacture, will appear from the description to follow, covering that embodiment of the invention, which, for the purpose of the present application, I have illustrated in the accompanying drawings, in which:

Figure I is a sectional elevation through a gear constructed in accordance with the present invention.

Fig. II is an end elevation of the gear shown in Fig. I.

Fig. III is a detailed sectional elevation of the outer gear ring shown in Fig. I.

Fig. IV is an end elevation of the ring shown in Fig. III.

Fig. V is a sectional elevation through the inner gear ring shown in Fig. I, and Fig. VI is an end elevation of the same.

In accordance with my invention, the generator gear is formed of a plurality of interengaging parts, shown in Fig. I as the inner and outer rings or discs 10 and 11 respectively, the latter being provided with teeth 12 for engagement with a driving gear such as the cam-shaft gear of the train of gears referred to above. The inner ring 10 is directly mounted upon the end of a generator shaft 13 and is secured by a key 14 in the usual manner. The inner ring is disposed within the recessed portion 15 of the outer ring, and is provided with a hub-like portion 16 fitting within a bore 17 of the outer ring. A series of shear resisting members in the form of headless pins 18, preferably of hard fiber or other suitable non-metallic material, serve as driving elements for the outer ring 11, the pins being disposed in registering openings 19 and 20 of the inner and outer rings respectively, whereby the inner ring is made to drive the outer ring, while the fiber or non-metallic pins act to deaden or reduce the noise ordinarily produced by the timing gears. The pins 18 preferably lie wholly within the walls of the two rings, with their ends adjacent or close to the sides of the rings, as shown in Fig. I, said ends being slightly beveled to facilitate the insertion of the pins within the openings of the rings. The pins are held against longitudinal displacement in one direction by a plate or washer 21 on the reduced end 22 of the shaft 13, the washer being secured by a nut 23 as shown in Fig. I. The washer not only prevents displacement of the pins, but holds the several parts of the gear in assembled position upon the shaft and prevents outward displacement of the gear as a whole. The pins are preferably held against longitudinal movement in the opposite direction by the integrally formed shoulders or abutments 24 of the inner ring 10, which are beveled to correspond substantially to the bevel on the ends of the pins when the holes 19 are drilled in the ring. However, other suitable means may be provided for holding the pins against inward movement, if desired.

The anti-thrash gear described above, is one of extremely simple construction, the several parts of which can be manufactured, assembled and applied to the power shaft at a relatively low cost, the construction being such as to afford entire satisfaction for the purpose provided, and to insure relatively long life in a gear of this type.

While I have shown in considerable detail, a specific embodiment of my invention, it is to be understood that this showing and description are illustrative only, and that I do not regard the invention as limited to the details of construction illustrated and described, except in so far as I have included such limitations within the terms of the following claims, in which it is my intention to claim all novelty inherent in my invention broadly, as well as specifically.

I claim as my invention:

1. In combination, a power shaft, a gear upon the shaft including interengaging inner and outer metallic rings fitted to prevent relative radial movement, the inner of said rings having a flange and a hub portion, the outer of said rings having a recess adapted to receive the flange and a bore adapted to receive the hub portion, a plurality of hard non-metallic driving pins carried by one of the rings and extending into driving engagement with the other, and means for holding said rings and pins as a unit upon said shaft.

2. In combination, a power shaft, a gear upon the shaft including inner and outer interengaging rings fitted to prevent relative radial movement, the outer of said rings being provided with teeth and having an inturned flange with a central opening, the inner of said rings having a hub portion within said opening and an outwardly extending flange abutting said inturned flange, a plurality of removable non-metallic driving pins engaging both of said flanges, and means for preventing longitudinal displacement of said pins.

3. In combination, a power shaft, a gear upon the shaft including interengaging rings, one of which is rigid upon the shaft, a plurality of removable driving pins connecting said rings, and common means adapted to hold the gear upon the shaft and to prevent displacement of the pins.

4. In combination, a power shaft, a gear upon the shaft including inter-engaging rings, one of which is rigid upon the shaft, a plurality of non-metallic pins positioned in registering openings formed in said rings, and means for preventing longitudinal displacement of said pins and rings.

5. In combination, a power shaft, a gear upon the shaft including inter-engaging rings, one of which is rigid upon the shaft, a plurality of non-metallic pins positioned in registering openings formed in said rings, and a member secured upon the shaft and adapted to hold each of said pins against displacement.

6. In combination, a power shaft, a gear upon the shaft including inter-engaging rings, one of which is rigid upon the shaft, a plurality of pins positioned in registering openings formed in said rings, and a plate detachably mounted upon the shaft and adapted to prevent longitudinal displacement of the pins.

7. In combination, a power shaft, a gear upon the shaft including inter-engaging rings, one of which is rigid upon the shaft, a plurality of pins positioned in registering openings formed in said rings, a washer upon the shaft adapted to prevent displacement of said pins and said rings, and a nut upon the shaft adapted to secure the washer thereon.

8. In combination, a power shaft, a gear upon the shaft including inter-engaging rings, one having a hub portion fitting in a bore of the opposite ring, a removable key connecting the hub carrying ring with the shaft, a plurality of pins connecting said rings and having their ends substantially flush with the sides of the rings, and means for preventing longitudinal displacement of said pins.

9. In combination, a power shaft, a gear upon the shaft including inter-engaging rings, a plurality of pins inserted in registering apertures formed in said rings, one of the rings having abutments adapted to prevent displacement of the pins longitudinally in one direction, and separate means adapted to prevent displacement of the pins longitudinally in the opposite direction.

10. In a device of the class described, a driving gear comprising a pair of inter-engaging rings adapted for insertion upon a shaft and having registering openings, and pins inserted in said openings and having their ends terminating adjacent the sides of the rings, one of which is provided with an abutment for each pin adapted to prevent longitudinal displacement of the pin in one direction.

11. In a device of the class described, a driving gear comprising a pair of rings, each having a radially extending flange overlying the radially extending flange of the other, said flanges being adapted to prevent relative radial movement, and having therein registering openings spaced around the axis of the gear and a plurality of hard fibre pins fitting said openings to transmit torque from one ring to the other.

12. In combination, a power shaft, a gear upon the shaft, including a pair of metallic rings, each ring having a radially extending flange overlying the radially extending flange of the other ring and fitted to prevent relative radial movement therebetween, one ring having gear teeth thereon and the other being locked to said shaft, said flanges having therein registering openings spaced around the axis of the gear and a plurality of hard fiber pins fitting said openings whereby driving force is transmitted to said toothed ring.

13. In combination a power shaft, a gear on the shaft including interengaging inner and outer metallic rings fitted to prevent relative radial movement, the outer of said rings being provided with teeth and the inner of said rings having a hub portion, and hard non-metallic shear resisting members interconnecting the rings adapted to transmit torque from one ring to the other.

In testimony whereof, I affix my signature.

ARTHUR J. BAKER.